Dec. 23, 1930. O. M. KREMBS 1,785,778
POCKETED WELDING, BRAZING, AND HARD SOLDERING ROD
Filed March 11, 1929
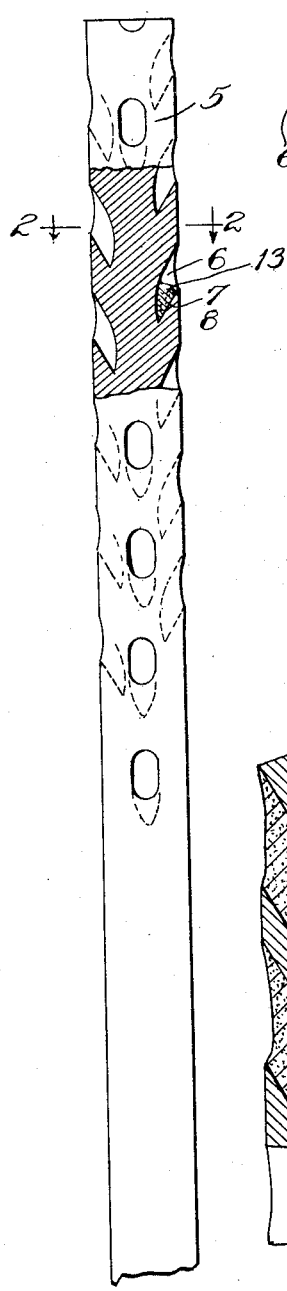
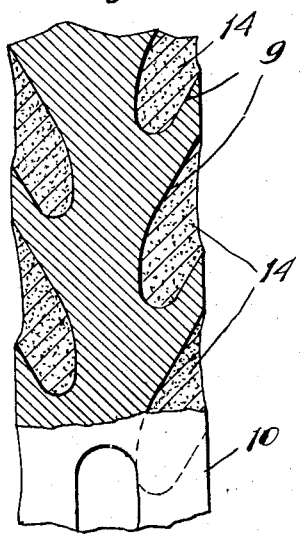
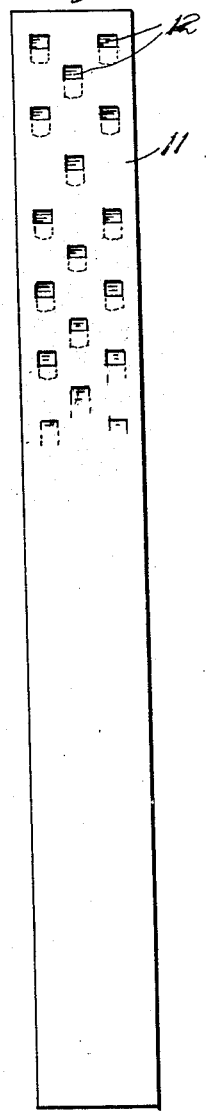
Inventor
Ottmar M. Krembs
by John E. Titus
Atty Patented Dec. 23, 1930

1,785,778

UNITED STATES PATENT OFFICE

OTTMAR M. KREMBS, OF GLENCOE, ILLINOIS

POCKETED WELDING, BRAZING, AND HARD-SOLDERING ROD

Application filed March 11, 1929. Serial No. 346,177.

This invention relates to improvements in welding, brazing and hard-soldering rods, and a main object of the invention is to provide such a rod which has means or provisions made therein for carrying the flux in the operations in which such rods are used, and also for carrying certain additional metals which might be advantageous in special uses to which the rod is put.

Another object is to provide a rod which is adaptable for carrying the flux or the metals in a dry powdered form, whereby the user can readily flux or prepare the rod by dipping it into the powdered flux. Other objects are to provide a rod which can be fluxed at once throughout its entire length, and in which the flux is evenly distributed and securely held in place until the rod is used up; and to provide such a rod in which the flux is distributed along the rod in proper proportions.

Heretofore the scavenging fluxes for clarifying the metals have been incorporated in the electrodes used for arc welding, wherein such materials were applied to the rod electrodes in paste form and allowed to harden, or held on the electrode by various kinds of sheathings; but in my present invention I provide actual pockets in the surface of the rod. These pockets are distributed along in the surface of the rod, and are for carrying the fluxes used in welding, brazing and hard-soldering operations, either in paste or powdered form, which fluxes are for the purpose of preventing oxidization and for guiding and causing the metal to flow along the surface of the work and into the joints.

Illustrations of embodiments of my invention are shown in the accompanying drawings, in which:

Fig. 1 is an elevation, partly in section, of a round welding, brazing or hard-soldering rod.

Fig. 2 is a cross section of Fig. 1, taken on the line 2—2.

Fig. 3 is a cross section of a cast rod.

Fig. 4 is a cross section of a flat rod.

Fig. 5 is an elevation of the flat rod shown in Fig. 4.

In Fig. 1 is shown a round rod 5 which may be made by extruding the metal of the rod through suitable dies. As the rod is issuing from the die the pockets 6 can be formed in the surface of the rod by rapidly operated hammers, or the pockets may be pressed into the surface of the rod of soft material, or formed in different manners.

The pockets 6 are sloped in one longitudinal direction of the rod, so that they project downwardly when the rod is held in the upright position in which it is customarily used. One side 7 of the pocket 6 is thereby undercut or sloped under the exterior surface portion 8 of the rod, so that the flux or particles of metal are positively prevented from falling out. As shown in Fig. 2, the pockets may be conveniently distributed in rows around the rod.

In the harder metals, where it is necessary to form the rods by casting, see Fig. 3, the pockets 9 are formed in the rod 10 in the casting operation, the pockets 9 being rounded or tapered as desired.

In Figs. 4 and 5, the rod 11 is in the form of a flat strip and the inclined pockets 12 are provided at intervals in one of the wider surfaces to ensure the even distribution of the flux at the heated end of the rod.

In use, the dry flux or powdered materials may be rubbed into the pockets, or the rod thrust into the flux. The rod may then be tapped on the lower end to work the flux down into the lower enclosed portions of the pockets and to jar off the surplus material. The dry flux is illustrated in one of the pockets at 13 in Fig. 1. In Fig. 3 the pockets are shown as filled with flux 14 in paste form.

With the rods made according to my invention, it is possible to complete a weld of considerable length without stopping. This prevents the breaks and uneven places in the weld which are unavoidable when the operator has to stop and dip the end of the rod into the flux as the rod is used up, and obviously the rate at which the operations can be performed is increased.

As can be perceived from the drawing, the pocketing or flux retaining means which I provide are adaptable for rods of any cross-sectional shape or size, and it is not necessary to make the rods of one special shape, which might not be suited for the different kinds of work on which the rod is used. The rods can be made of any desired cross-sectional form to suit the operation for which it is intended.

Some kinds of fluxes have a tendency to run down the bare rods and form a globule at the heated end of the rod, so that there is at times an excessive amount of flux, and other kinds of flux will not adhere to the surface of the rod in sufficient quantities to make a good weld; while, with the pockets, such difficulties are effectually avoided.

Another advantage of the pocketed rods, as distinguished from the merely indented or recessed rods, is that better protection is afforded for the more readily oxidizable materials, such as the zinc, tin, lead and the like which are incorporated in the bronze and other non-ferrous welding and brazing rods. The fumes, such as zinc oxide, are thereby reduced, making the work more agreeable and healthful for the operator.

The pockets also permit the insertion of other ingredients, such as metals for governing the color or strength of the weld.

Having thus described my invention, my claims are:

1. A brazing, welding, or hard-soldering rod consisting of a metal rod having pockets formed in its peripheral surface which extend angularly into the rod so that a predetermined amount of flux or metal in powdered form will be retained in the pockets.

2. A brazing, welding, or hard-soldering rod consisting of a metal rod having a plurality of spaced open pockets formed in its peripheral surface, one side of the pockets being undercut to retain the flux or added metals when the rod is held in an upright position.

3. A welding, brazing, or hard-soldering rod consisting of a metal rod having undercut open pockets formed in its surface, and dry flux material in the pockets.

4. A welding, brazing, or hard-soldering rod consisting of a metal rod having open pockets spaced along its length, the pockets extending into the rod in an angular relation with the axis of the rod, and powdered flux and metal contained in the pockets.

Signed at Chicago, this 4th day of March, 1929.

OTTMAR M. KREMBS.